United States Patent [19]

Henry et al.

[11] Patent Number: 5,011,504

[45] Date of Patent: Apr. 30, 1991

[54] FUEL OIL ADDITIVES

[75] Inventors: Cyrus P. Henry, Claymont; Michael W. J. West, Wilmington, both of Del.

[73] Assignee: E. I. Du Pont de Nemours and Company, Wilmington, Del.

[21] Appl. No.: 560,297

[22] Filed: Jul. 27, 1990

Related U.S. Application Data

[63] Continuation of Ser. No. 405,589, Sep. 8, 1989, abandoned, which is a continuation of Ser. No. 204,154, May 31, 1988, abandoned, which is a continuation-in-part of Ser. No. 992,263, Oct. 23, 1986, abandoned.

[51] Int. Cl.$^5$ .............................................. C10L 1/22
[52] U.S. Cl. .................................... 44/392; 44/394; 44/397
[58] Field of Search .................. 44/391, 392, 397, 394

[56] References Cited

U.S. PATENT DOCUMENTS

| | | | |
|---|---|---|---|
| 2,737,452 | 3/1956 | Catlin et al. | 44/392 |
| 2,737,496 | 3/1956 | Catlin | 252/515 |
| 3,186,810 | 6/1965 | Dunworth | 44/62 |
| 3,287,298 | 11/1966 | D'Alelio | 525/294 |
| 3,864,099 | 2/1975 | Ek | 44/62 |
| 4,058,371 | 11/1977 | Ilnyckyj | 44/62 |
| 4,388,448 | 6/1983 | Melby | 525/327 |
| 4,414,372 | 11/1983 | Farnham | 526/190 |
| 4,417,034 | 11/1983 | Webster | 526/190 |
| 4,508,880 | 4/1985 | Webster | 526/190 |
| 4,524,196 | 6/1985 | Farnham | 526/190 |
| 4,588,795 | 5/1986 | Dicker et al. | 526/192 |
| 4,661,122 | 4/1987 | Lewtas | 44/62 |
| 4,713,088 | 12/1987 | Tack | 44/62 |

FOREIGN PATENT DOCUMENTS 184692 6/1986 European Pat. Off. .
265254 4/1988 European Pat. Off. .

OTHER PUBLICATIONS

"Group Transfer Polymerization of Methyl Methacrylate" Makromol. Chem., Rapid Commun. 6,335-339 (1985).

*Primary Examiner*—Jacqueline V. Howard
*Attorney, Agent, or Firm*—Charles J. Shoaf

[57] ABSTRACT

AB and ABA block copolymers of acrylics and acrylic amines are useful as oil additives to diminish sediment and color formation. The copolymers are preferably formed by group transfer polymerization.

11 Claims, No Drawings

FUEL OIL ADDITIVES

This application is a continuation of application Ser. No. 07/405,589 filed Sept. 8, 1989, which is a continuation of Ser. No. 07/204,154 filed May 31, 1988, which is a continuation-in-part of Ser. No. 06/992,263, filed Oct. 23, 1986, all now abandoned and it claims similiar subject matters as Ser. No. 07/062,500, filed June 11, 1987, now abandoned.

BACKGROUND OF THE INVENTION

Fuel oils such as home heating fuels, automotive fuel oils, gas turbine fuels, and heavy fuels used for industrial heating purposes and for slow and medium speed diesels, as well as lubricating oils for engines and other uses, are susceptible to deterioration during storage, resulting in the formation of insoluble sludge, sediment, and discoloration. The invention is concerned with stabilized fuels and additive compositions for stabilizing such fuel oils. The additives act as combined antioxidants and as dispersants.

A wide variety of additives, especially various amines, have been proposed and widely used to prevent discoloration and sediment formation by interfering with the formation of these colorants or insoluble materials during storage or when thermally stressed, for example, N,N-dimethylcyclohexyl amine, U.S. Pat. No. 3,490,882. Other additives are described in U.S. Pat. Nos. 3,186,810, and 2,737,452 for use in fuel oils and U.S. Pat. No. 2,737,496 for use in lubricating oils. These additives use diethyl aminoethylmethacrylate, styrene and alkylmethacrylate.

A variety of polymeric materials have also been proposed and widely used to prevent sedimentation of insoluble sludge by dispersant action. These materials generally do not prevent the formation of color or insoluble material but prevent detrimental effects such as clogged filters, nozzles, injectors, heat exchangers, and fouling of other parts of fuel distribution or use systems with insoluble sludge formed during storage or by thermal stressing. However, ideal oil additives have not been found. Improvements are always needed.

Group transfer polymerization is known to be useful for producing acrylic and methacrylic polymers having desirable features.

O. W. Webster, U.S. Pat. No. 4,417,034 (Nov. 22, 1983) and U.S. Pat. No. 4,508,880 (Apr. 2, 1985), and W. B. Farnham and D. Y. Sogah, U.S. Pat. No. 4,414,372 (Nov. 8, 1983) and U.S. Pat. No. 4,524,196 (June 18, 1985) showed that acrylic copolymers can be prepared via group transfer polymerization. (GTP). GTP applications and techniques have also been described in European Patent Application No. 184,692, Quirk et al., published June 18, 1986, and in the literature including F. Bandermann and H. Speikamp (of the Institute fur Technische Chemie, UniversitatGesamthochschule Essen) "Group Transfer polymerization of Methyl Methacrylate" Makromol. Chem., Rapid Commun. 6,335-339 (1985). Oxyanion catalysts for GTP processes are described in U.S. Pat. No. 4,588,795, Dicker et al., granted May 13, 1986. AB block copolymers of acrylics and oxirane-containing acrylics are the subject of U.S. Pat. No. 4,656,226 issued Apr. 7, 1987 Hutchins et al. Polymers made by GTP have been suggested to be generally useable as oil additives in U.S. patent application Ser. No. 4,656,226 issued Apr. 7, 1987.

U.S. Pat. No. 4,388,448, Melby, discusses low temperature anionic polymerization to make epoxy block copolymers.

The above patents and publications are incorporated herein by reference.

SUMMARY OF THE INVENTION

The present invention provides an AB or ABA block copolymer wherein
the A block(s) consist essentially of polymerized monomers selected from the group consisting of acrylate and methacrylate monomers wherein the ester is made from an alcohol having 4-60 carbon atoms, and
the B block contains polymerized amine monomers selected from the group consisting of acrylate and methacrylate monomers containing primary, secondary or tertiary amine groups, and comprises polymerized monomers selected from such amine monomers and acrylate and methacrylate monomers,
wherein the copolymer contains at least two monomer units and up to a large number such as 10,000 in each A block, and from 2 to 500 amine monomer units in the B block.

A preferred embodiment uses as the additive a block copolymer of 2-ethyl-hexylmethacrylate and dimethyl aminoethyl methacrylate.

DETAILED DESCRIPTION OF THE INVENTION

The present invention is based on the discovery that AB and ABA block copolymers such as of acrylics and amino-containing acrylics B, preferably prepared by group transfer polymerization, are unusually effective to stabilize such fuel oils against deterioration, both discoloration and insoluble sludge formation.

Polymers prepared by this invention have two unusual features in combination: they are unexpectedly effective as dispersants compared to other polymeric materials commonly used, and they are unusually effective in preventing the formation of color and sediment. In a complex relationship, color formation results from both oxidation and sludge-forming factors. Different oils behave differently. However, it is desirable to have additives which diminish color and sediment formation in some fuels and lube oils, even if they are not equally efficacious in all types.

The polymers of this invention may be mixed with fuels by addition of the concentrated solution in a solvent miscible with fuel, or after dilution with fuel or other solvents. Addition can be undertaken at the refinery, during distribution of fuel oil, by the ultimate consumers of fuel or otherwise as may be conveniently practiced.

A polymer solution may also be pre-mixed with other additives to improve stabilizing performance, for example, N,N'disalicylidene-1,2-propane-diamine (DMD). The polymer solution may also be pre-mixed with other additives which improve other properties of fuel oils, for example, low temperature flow improvers, corrosion inhibitors, electrical conductivity improvers, cetane improvers, and dyes.

The quantity of additive employed in practicing this invention will depend on the initial condition and degree of stability of the fuel oil and the effect desired. While the polymer may be used in proportions of 0.5 mg/liter to 500 mg/liter of fuel oil, normally 2 to 100 mg/liter will be used. Generally, the additive will be in the form of a solution of the polymer in hydrocarbon or ether solvents that are miscible or compatible with the fuel or lube oils; generally in concentrations of 10–70%, preferably 10–50%, depending on the practical upper limit of viscosity.

In certain preferred embodiments, polymers of the invention are made by group transfer polymerization. By group transfer polymerization is meant a polymerization process in which polymerization of monomers having carbon-carbon double bonds is initiated by certain initiators of the formula Q—Z where Z is an activating substituent that becomes attached to one end of the growing polymer molecule and where Q is a group that continuously transfers to the other end of the growing polymer molecule as more monomer is added to the growing polymer molecule. Thus, polymerization of the monomer,

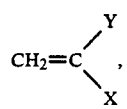

initiated by a group transfer initiator, Q—Z, proceeds as follows:

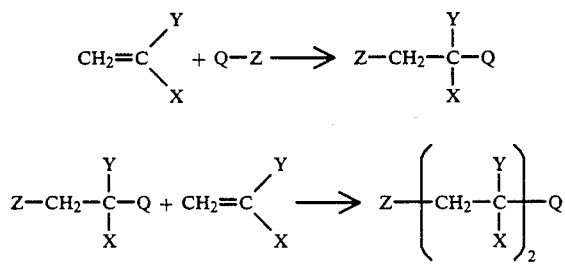

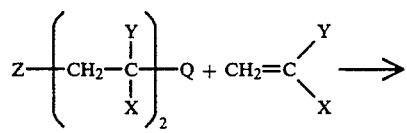

polymer and the group, Q, is referred to as a "living" group transfer initiating site.

The word "living" is sometimes used herein in quotation marks to indicate its special meaning and to distinguish it from substances which are alive in a biological sense.

More particularly, in the preparation of polymers of the invention, use is made of the "group transfer" polymerization process of the general type described in part by W. B. Farnham and D. Y. Sogah, U.S. Pat. No. 4,414,372 and by O. W. Webster, U.S. Pat. No. 4,417,034, and in continuation-in-part U.S. Pat. No. 4,508,880 Webster, granted Apr. 1, 1985, and U.S. Pat. No. 4,524,196 Farnham and Sogah, granted June 18, 1985, the disclosures of all of which are incorporated herein by reference. Group transfer polymerization produces a "living polymer" when an initiator of the formula $(R^1)_3MZ$ is used to initiate polymerization of a monomer having a carbon-carbon double bond.

In the initiator, $(R^1)_3MZ$, the Z group is an activating substituent that becomes attached to one end of the "living" polymer molecule. The $(R^1)_3M$ group becomes attached to the other ("living") end of the "living" polymer molecule. The resulting "living" polymer molecule can then itself act as an initiator for polymerization of the same or a different monomer to produce a new "living" polymer molecule having the Z activating substituent at one end and the $(R^1)_{3M}$ group at the other ("living") end. The "living" polymer may then be deactivated, if desired, by contacting it with an active proton source such as an alcohol. At this point, it might be useful to consider a specific example—the group transfer polymerization of a specific monomer (in this case, methyl methacrylate) using a specific group transfer initiator (in this case 1-trimethylsiloxy-1-isobutoxy-2-methylpropene). The reaction of 1 mole of initiator with n moles of monomer produces "living" polymer as follows:

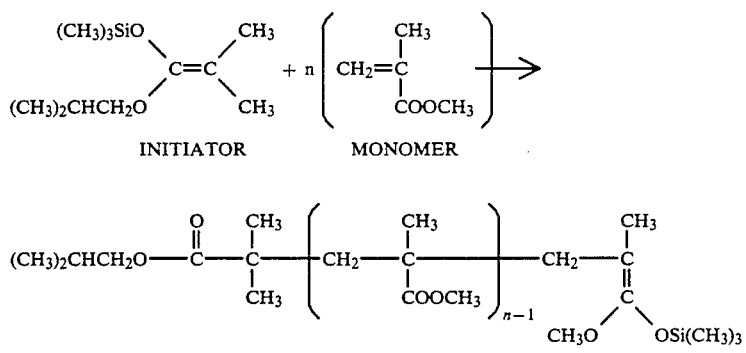

The group, Q, is thus an active site that can initiate further polymerization of more monomer. The polymer molecule having the group Q, is referred to as a "living"

The

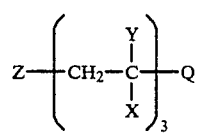

group shown on the left side of the "living" polymer molecule is derived from the activating group, Z, which, in the initiator, was in the form

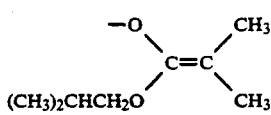

The —Si(CH$_3$)$_3$ group on the right side ("living" end) of the "living" polymer molecule is the (R$^1$$_3$M) group. The "living" polymer molecule can act as an initiator to initiate polymerization of the same or a different monomer. Thus, if the above "living" polymer is contacted with m moles of butyl methacrylate in the presence of active catalyst, the following "living" polymer is obtained:

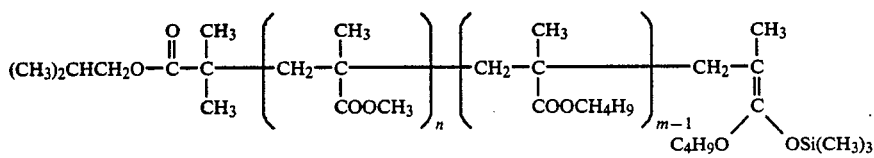

If the resulting "living" polymer is then contacted with methanol, the following deactivated polymer is obtained.

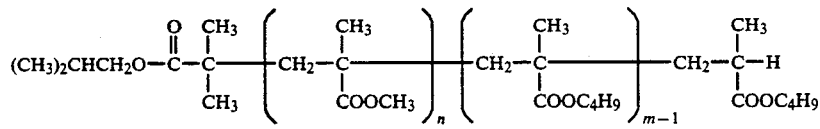

The following examples are given to illustrate this invention, modes of practicing it, and advantageous results to be obtained. Parts, proportions and percentages herein are by weight except where indicated otherwise.

INTRODUCTION TO EXAMPLES

Test Procedures

The effectiveness of the polymer to inhibit deterioration and disperse sediment is illustrated by an 80° F.) (175° F.) seven-day storage test on samples of unstable fuels. Several fuels containing unstable thermally or catalytically cracked components blended with kerosene or straight run fuels were used. Sediment formed during the aging period was compared to sediment content with no polymer or additive, and expressed as a percentage of the result with no additive. The color of the filtered fuel was determined before and after testing using ASTM Method D1500; the formation of less color than without additives, along with less sediment, shows a stabilizing effect by preventing formation of sludge and color. The formation of less sediment but with the same or even a darker color than without polymer or additive indicates dispersant benefits only. The tests used to determine amounts of sediments (or sludge) caught on a filter gave equivalent results to gravimetric tests done using ASTM Method D-2274, normalized to values of 100 for samples with no additive. These examples were compositions which might be typically used for No. 2 home heating or automotive diesel fuels. The weights of sediment formed during seven days' aging at 80° C. was 4 to 9 mg/100 ml without additive. Less than 2 mg sediment/100 ml is considered a desirable goal. Although the present invention does not reach this ultimate goal with all the tested fuels, it is a substantial improvement over the prior art.

The following examples show these materials to have novel properties as oil additives. An important aspect of the invention is the arrangement of the two monomer types into blocks of greatly different solubility characteristics; i.e. a polar, tertiary-amine-containinq block, and a non-polar block. This arrangement gives effective dispersion characteristics. It can be achieved more easily with GTP chemistry, less easily with free-radical chemistry. GTP gives greater control over polymer structure.

This arrangement gives materials of greater water- and sludge-dispersing properties than the random arrangements of the same monomers, as by free-radical polymerization as is already widely practiced in the oil additives art. Sample 3 is a random polymer that serves to show that the blockiness of the other materials is of practical importance.

Each of the tertiary amine/nonpolar alkyl methacrylate candidates was made by essentially the same experimental techniques, which are summarized by using Sample 3 as an example. Parts, percentages and proportions herein are by weight except where indicated otherwise.

EXAMPLES AND COMPARATIVE TESTS 1–14

Preparation of EHMA//DMAEMA (Dp 43//106)

All monomers and solvents were treated by passing through a column of activity I neutral alumina. A dry, nitrogen-flushed flask with Friedrich's condenser to a nitrogen bubbler, stainless steel stirrer, thermometer and serum cap was charged with 192.5 g tetrahydrofuran, 0.84 g 1-trimethylsiloxy-1-methoxy-2-methylpropene, and 48 microliters 1 M tetra-n-butylammonium 3-chlorobenzoate in acetonitrile ("catalyst").

Simultaneously there were begun feeds of 96 microliters of catalyst in 5 mL tetrahydrofuran over 1 hour and 41.1 g 2-ethyl-hexylmethacrylate over 22 minutes.

After 1 hour had passed since the start of the feeds, 100 microliters of catalyst was added to the reaction mixture, followed by 78.9 grams of 2-(N,N-dimethylamino)ethyl methacrylate fed over 20 minutes. After a 1-hour hold, the reaction was quenched by the addition of 5 mL of methanol.

TABLE I

| Sample Number | First Monomer | Designed Block Degree of Polymerization | Second Monomer | Designed Block Degree of Polymerization |
| --- | --- | --- | --- | --- |
| 1 | EHMA | 43 | DMAEMA | 106 |
| 2 | (Control) |  | " | 58 |
| 3 | Random EHMA | 15 | Random DMAEMA | 36 |
| 4 | EHMA | 16 | DMAEMA | 40 |
| 5 | EHMA | 5.6 | " | 12.6 |
| 6 | EHMA | 16.7 | " | 5.2 |
| 7 | EHMA | 16.7 | " | 14.9 |
| 8 | EHMA | 16.7 | " | 40.5 |
| 9 | DMAEMA | 5.4 | EHMA |  |
| 10 | DMAEMA | 43.6 | EHMA |  |
| 11 | BMA | 7.9 | DMAEMA | 21.2 |

Data which demonstrate the improvement due to blockiness rather than monomer types:

TABLE 2

Normalized % Sludge Versus Control Using Additive at 14.3 mg/liters, after 7 days at 80° C.

| Additive (Sample No.) | Fuel A | Fuel B | Comments |
| --- | --- | --- | --- |
| Control 0 | 100 | 100 | — |
| Control 2 | 43 | 18 | All DMAEMA |
| Control 3 | 66 | 34 | Random monomer distribution via GTP, moderate MW |
| Control 12 | 45 | 38 | Random monomer distribution via free-radical polymerization with Vazo 64 initiator from Du Pont |
| Control 13 | 58 | 55 | Commercial additive -Du Pont |
| 1 | 26 | 18 | Higher MW blocks |
| 4 | 38 | 23 | Moderate MW blocks |
| 5 | 27 | 23 | Lower MW blocks |

(Note that all Samples above contain about 66 wt % DMAEMA and 44% EHMA, except that Control Sample 12 had 70%, Control Sample 2 had 100% DMAEMA, and Control Sample 0 had no additive. Also, Control Sample 13 had 10% diethyl aminoethyl methacrylate, 50% tridecylmethacrylate, and 40% styrene).

Table 2 shows that a wide variety of monomer ratios can be used, and shows that EHMA or BMA can be used.

TABLE 3

Comparison of the Effect of Various Additives at 14.3 mg/liter (5 lbs/1000 bbl of 42 gal.)

| Additive Sample No. | Normalized % Sludge | | | | | Color | | | | |
| --- | --- | --- | --- | --- | --- | --- | --- | --- | --- | --- |
| | Fuel A' | Fuel B' | Fuel C' | Fuel D' | Fuel E' | Fuel A' | Fuel B' | Fuel C' | Fuel D' | Fuel E' |
| (None) | 100 | 100 | 100 | 100 | 100 | 6.0 | 4.5 | 5.5 | 4.5 | 7.5 |
| Ctrl 12 | 74 |  |  | 38 | 75 | 5.0 |  |  | 4.0 | 3.5 |
| Ctrl 13 | 60 | 101 | 115 | 82 | 100 | 5.5 | 4.5 | 5.0 | 4.0 | 6.5 |
| 6 | 83 | 81 | 92 | 84 | 80 | 5.5 | 4.5 | 5.0 | 4.0 | 5.0 |
| 7 | 42 | 11 | 42 | 53 | 23 | 5.5 | 3.5 | 4.5 | 4.0 | 5.0 |
| 8 | 30 | 13 | 9 | 27 | 5 | 5.0 | 3.0 | 3.5 | 3.5 | 4.0 |
| 9 | 17 | 17 | 35 | 41 | 30 | 5.5 | 3.5 | 5.0 | 4.0 | 5.5 |
| 10 | 59 | 88 | 121 | 71 | 96 | 5.5 | 4.5 | 5.0 | 4.5 | 7.0 |
| 11 | 45 | 17 | 11 | 32 | 6 | 5.0 | 3.0 | 3.5 | 4.5 | 3.5 |

It will be seen from the data that performance of additives varies from one fuel oil to another. As is known in the art, differences in fuel oils, as well as lube oils, leads to the need to tailor the additives to the oils. While not optimum in all types of fuel oils, the advantages of the invention in some fuel oils shows their unobviousness. The data support that additives of the invention, with regular AB (or, by extrapolation, ABA) blocks, of acrylics as the A group and acrylic amines as the B group, preferably prepared by group transfer polymerization, perform better in reducing sediment and color formation in several oils than do random and other polymers. Free radical polymerization makes copolymers that are essentially random and do not behave the same way as the present block copolymers. Sample 2 with all DMAEMA in effect provided a higher concentration of amine antioxidant; compared at equivalent levels of amine with samples of the invention, its results would have been less good. The amine antioxidant; compared at equivalent levels of amine with samples of the invention, its results would have been less good. The inveniton permits the use of smaller amounts of additives of less cost for better results in various fuel and lube oils, particularly combining effects of diminishing both sediment and color formation with a single additive polymer.

We claim:

1. A fuel oil composition comprising fuel oil and an additive wherein said additive comprises an AB or ABA block copolymer wherein the A block(s) consist essentially of polymerized monomers selected from the group consisting of acrylate and methacrylate monomers without amine groups wherein the ester is made from an alcohol having 4-60 carbon atoms, and the B block consists essentially of polymerized monomers selected from the group consisting of acrylate and methacrylate monomers containing primary, secondary or tertiary amine groups, with other acrylate and methacrylate monomers, wherein the copolymer contains at least 2 monomer units in each A block and from 2 to 500 amine monomers units in the B block with a concentration in the additive of 10-70% by weight copolymer in solvent, and a concentration of at least 0.5-500 mg/liter of said copolymer in said fuel oil.

2. A fuel oil of claim 1 with a concentration in the additive of 10-50% by weight copolymer in solvent and a concentration of said copolymer in said fuel oil is 2–100 mg/liter.

3. The fuel oil of claim 1 wherein the block copolymer is made by group transfer polymerization.

4. The fuel oil of claim 1 wherein the monomers of each A block are made from an alcohol having 4–20 carbon atoms.

5. The fuel oil of claim 1 wherein the monomers of each A block are selected from the group consisting of butyl methacrylate, butyl acrylate, 2-ethylhexylmethacrylate, 2-ethyhexyl acrylate, laurylmethacrylate and lauryl acrylate.

6. The fuel oil of claim 2 wherein the monomers of the B block are selected from the group consisting of dimethyl aminoethyl methacrylate and diethyl aminoethyl methacrylate.

7. A fuel oil composition of claim 1 wherein the additive copolymer contains at least about 5 monomer units in each A block and from about 5 to 500 monomer units in the B block.

8. A fuel oil composition of claim 1 wherein the A block(s) consists essentially of 2-ethylhexylmethacrylate and the B block consists essentially of dimethylaminomethylmethacrylate.

9. A fuel oil composition of claim 7 wherein the A block(s) consists essentially of 2-ethylhexylmethacrylate and the B block consists essentially of dimethylaminoethylmethacrylate.

10. A fuel oil composition of claim 8 which contains about 66 weight percent of dimethylaminoethylmethacrylate and about 44 percent by weight of 2-ethylhexylmethacrylate.

11. A fuel oil composition of claim 8 wherein the A block has a degree of polymerization of about 17 and the B block has a degree of polymerization from about 15 to about 40.

* * * * *